(12) United States Patent
Herndon

(10) Patent No.: US 8,118,528 B2
(45) Date of Patent: Feb. 21, 2012

(54) FIELD REPLACEABLE HAMMER UNION WING NUT APPARATUS AND METHOD

(75) Inventor: Lawrence Herndon, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 311 days.

(21) Appl. No.: 12/291,441

(22) Filed: Nov. 11, 2008

(65) Prior Publication Data
US 2010/0117359 A1 May 13, 2010

(51) Int. Cl.
*F16B 37/08* (2006.01)
(52) U.S. Cl. ........ 411/432; 411/435; 285/33; 285/381.1
(58) Field of Classification Search .......... 411/432–435, 411/909; 285/381.1, 381.2, 33, 34, 909, 285/381.3, 381.5
See application file for complete search history.

(56) References Cited

U.S. PATENT DOCUMENTS

| | | | | |
|---|---|---|---|---|
| 604,224 | A | * | 5/1898 | Bennik ............................ 285/34 |
| 1,706,317 | A | * | 3/1929 | Oakes ........................... 411/433 |
| 1,953,582 | A | * | 4/1934 | Belknap ......................... 169/42 |
| 2,377,581 | A | * | 6/1945 | Shaffrey ....................... 411/433 |
| 3,320,355 | A | * | 5/1967 | Booker ....................... 174/84 R |
| 3,428,337 | A | * | 2/1969 | Read ............................... 285/18 |
| 4,531,872 | A | * | 7/1985 | Warkotsh ...................... 411/433 |
| 4,659,273 | A | * | 4/1987 | Dudley ......................... 411/373 |
| 4,874,193 | A | * | 10/1989 | Martin ......................... 285/369 |
| 4,923,349 | A | * | 5/1990 | Logsdon ....................... 411/433 |
| 4,930,961 | A | * | 6/1990 | Weis ............................. 411/266 |
| 5,226,678 | A | * | 7/1993 | Petranto ......................... 285/39 |
| 5,944,467 | A | * | 8/1999 | Yuta .............................. 411/433 |
| 6,799,930 | B1 | * | 10/2004 | More et al. .................... 411/433 |
| 6,945,569 | B1 | | 9/2005 | Diaz et al. |

* cited by examiner

*Primary Examiner* — Gary Estremsky
(74) *Attorney, Agent, or Firm* — John W. Wustenberg; McAfee & Taft

(57) ABSTRACT

A field replaceable wing nut having an arcuate body and an arcuate insert is disclosed. The wing nut is designed to replace an existing wing nut which has deformed or non-useable lugs on a hammer union connection. The wing nut has accurate alignment of the mounting threads using an alignment attachment device. Replacing the wing nut in the field does not require any special equipment or training. Each wing nut is designed for a particular pipe diameter.

17 Claims, 4 Drawing Sheets

FIELD REPLACEABLE HAMMER UNION WING NUT APPARATUS AND METHOD

BACKGROUND

Hammer unions are commonly employed to join pipe segments together. Typically, the wing nut component of the hammer union, which has a wing nut pipe segment with a threaded wing nut having integrated lugs, is tightened onto a male threaded pipe component by hammering upon the lugs. When the wing nut becomes unusable, it is usually necessary to remove the entire wing nut pipe segment from service.

It is standard practice to capture the wing nut on the wing nut pipe segment which prevents users from removing or replacing the wing nut. Once captured, the wing nut and the wing nut pipe segment are generally inseparable.

Often, before the full, useful life of the wing nut pipe segment is reached, one or more lugs on the wing nut will become deformed. A wing nut with one or more deformed lugs cannot reliably be mated to a male threaded piece of piping equipment. The piping equipment, however, would generally still be usable if the wing nut is replaced. At this time, there is no safe, field-installable wing nut that can be used to replace deformed, damaged or worn-out wing nuts which are captured on the wing nut pipe segment.

Currently, when a wing nut becomes deformed due to damaged or deformed lug(s), the end of the wing nut pipe segment on which the wing nut is installed is cut off, the deformed wing nut is replaced with a new wing nut, and the pipe is machined and welded together. Unfortunately, this repair approach often has quality problems. These quality problems lead to safety issues.

Safety of a joined hammer union is a major concern because hammer unions are often used to connect piping carrying large volumes of fluid under high pressures. Due to the internal forces on the pipe joint, hammer union joints commonly fail in an explosive manner. A misaligned wing nut on a hammer union joint may hold pressure for a period of time, but may ultimately fail as the pressure pushes against the joint.

An attempted field repair of a wing nut using common cutting and welding techniques creates a significant risk for misaligned or poorly welded joints. In normal field situations, there are few or no field personnel qualified to perform the highly skilled welding and machining operations required for a safe repair. Additionally, there is usually an absence of qualified welding and machining standards for field personnel to follow.

Since field repairs may result in significant down time, there is also an economic impact when removing a pipe section to replace a deformed wing nut. In manufacturing and drilling operations, down time directly impacts a company's cost of operations.

As identified herein, there is a need for a field replaceable hammer union wing nut that does not require welding or machining. Additionally, there is a need for a field replaceable hammer union wing nut that may be easily and efficiently installed by field personnel.

SUMMARY OF THE INVENTION

One embodiment discloses a field replaceable wing nut comprising an arcuate body, an arcuate insert, and an attachment device. The arcuate body defines a first portion of a mounting thread, and the arcuate insert defines a second portion of a mounting thread. The attachment device is for connecting the arcuate body and arcuate insert. When the arcuate body and arcuate insert are connected, the first and second portions of the mounting thread define a complete mounting thread for receiving a threaded male pipe end.

Another embodiment discloses a multiple piece wing nut comprising a first arcuate body, a second arcuate body, and an attachment device. The first arcuate body has a first threaded portion, and the second arcuate body has a second threaded portion. The attachment device connects the second arcuate body to the first arcuate body. The connected first and second arcuate bodies form an annular body having a collar extending therefrom.

Still another embodiment discloses a wing nut comprising a first arcuate body, a second arcuate body, and a retaining ring. The first arcuate body has a first portion of a mounting thread thereon. The first arcuate body has a first and second clearance end defining a circumferential gap therebetween. The second arcuate body has a second portion of a mounting thread thereon. The second arcuate body has first and second mating ends for engaging the first and second clearance ends. The retaining ring is disposed about the first and second arcuate bodies. The first and second threaded portions define a complete connecting thread for receiving a threaded male pipe when the first and second arcuate bodies are connected.

A method is disclosed for replacing a wing nut assembly in the field comprising the following steps:
 (a) providing a first arcuate body;
 (b) radially receiving a pipe on which the wing nut is to be installed through a circumferential gap defined by the first arcuate body;
 (c) providing a second arcuate body;
 (d) inserting the second arcuate body in the gap; and
 (e) securing the first arcuate body to the second arcuate body.

DETAILED DESCRIPTION

Figure 1:
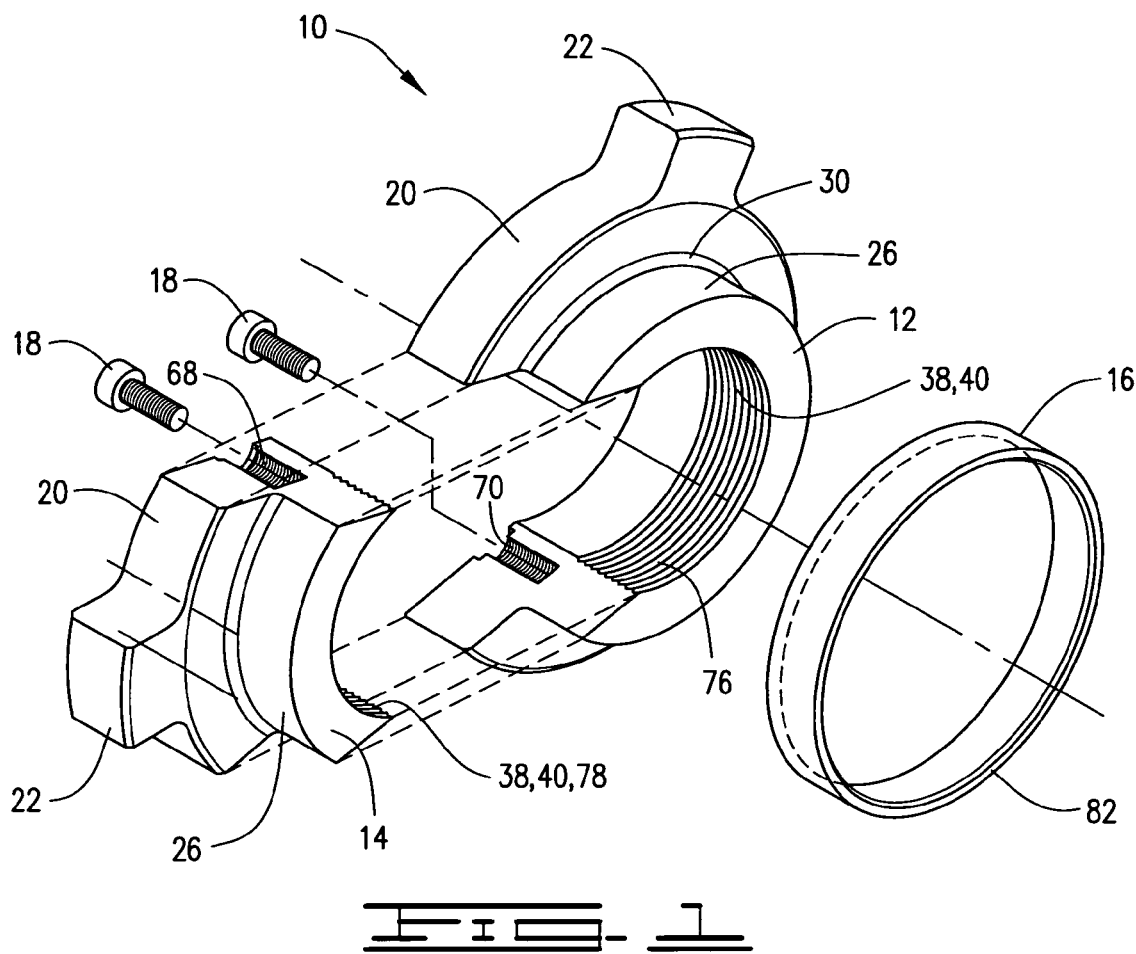
FIG. 1 is an exploded bottom perspective view of the wing nut.

This disclosure is directed to a field-installable wing nut that requires no welding or machining operations. The wing nut installation does not require any special qualifications or procedures, and can easily be accomplished by field maintenance personnel in normal field situations.

Generally, wing nut 10 is selected to correspond to a defined nominal pipe diameter. It is anticipated that a series of wing nuts 10 will be available for different sizes of pipes being employed.

Referring to FIGS. 1-7, wing nut 10 is generally comprised of arcuate body 12, arcuate insert 14, retaining ring 16, and attachment devices 18. Attachment devices 18 are used to connect, or join, arcuate insert 14 with arcuate body 12. Arcuate body 12 may also be referred to as the first arcuate body 12, and arcuate insert 14 may also be referred to as the second arcuate body 14.

Wing nut 10 is preferably an alloy or carbon steel piece capable of withstanding high pressure when fully assembled and installed. Arcuate body 12 and arcuate insert 14 are preferably manufactured out of the same material. A non-limiting example of the material to form arcuate body 12 and arcuate insert 14 is to use a circular metal slug of hot, rolled grade 4340 steel. Retaining ring 16 is preferably manufactured out of a material different than that of arcuate body 12 and arcuate insert 14. A non-limiting example is to use grade 4140 steel tubing for retaining ring 16. Furthermore, retaining ring 16 preferably has material properties with specific capabilities as described herein. Wing nut 10 may be fabricated from other types of materials. These materials are preferably matched to a pipe size, and with a desired pressure containment capability.

As depicted in the drawings, assembled wing nut 10 defines an annular body 20 with a plurality of lugs 22 thereon. Annular body 20, which may be referred to as upper ring 20, has inner diameter 21 and first outer diameter 24, and in the embodiment shown has three lugs 22 defined thereon. Assembled wing nut 10 has a collar 26 extending longitudinally from annular body 20. Collar 26 may be referred to as lower ring 26. Collar 26 has second outer diameter 28, which is preferably smaller than first outer diameter 24, so that shoulder 30 is defined by, and extends between, first and second outer diameters 24 and 28. Wing nut 10 has a length 32. Collar 26 has a collar length 34 that is shorter than length 32. Collar 26 has a threaded inner surface 38 extending along collar length 34 to define mounting or connecting threads 40, and has a collar thickness 42. Wing nut 10 is thus compatible with a male thread 36, and will receive a threaded male pipe segment as will be described in more detail herein.

Figure 2:
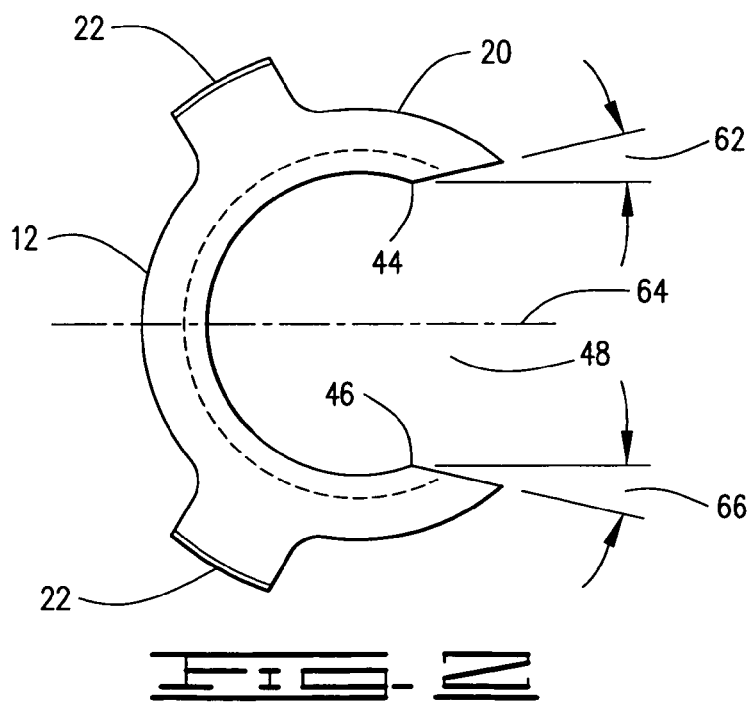
FIG. 2 depicts a top plan view of an arcuate body.

As depicted in FIG. 2, arcuate body 12 has an arc that is preferably equal to or greater than arcuate insert 14, and that is at least circumferentially 180 degrees. The embodiment shown has an arc of approximately 220 degrees. Arcuate insert 14 will complement arcuate body 12 so that when assembled, arcuate body 12 and arcuate insert 14 comprise wing nut 10.

Arcuate body 12 has a first clearance end 44 and a second clearance end 46 defining a gap or space 48 therebetween. Gap 48 will receive a pipe segment 50 therethrough. When pipe segment 50 is received through gap 48, and arcuate body 12 and arcuate insert 14 are connected, the assembled wing nut 10 will provide fluid communication between pipe segments 50 and 52 when connecting threads 40 are properly mated with male threads 36 on pipe segment 52.

Arcuate insert 14 has first and second mating ends 54 and 56. First clearance end 44 of arcuate body 12 will mate with first mating end 54 of arcuate insert 14. Second clearance end 46 of arcuate body 12 will mate with the second mating end 56 of arcuate insert 14. First and second seams, or joints 58 and 60, are formed when arcuate insert 14 is inserted or positioned in gap 48 with first clearance end 44 adjacent to and engaging first mating end 54, and second clearance end 46 adjacent to and engaging second mating end 56.

Figure 3:
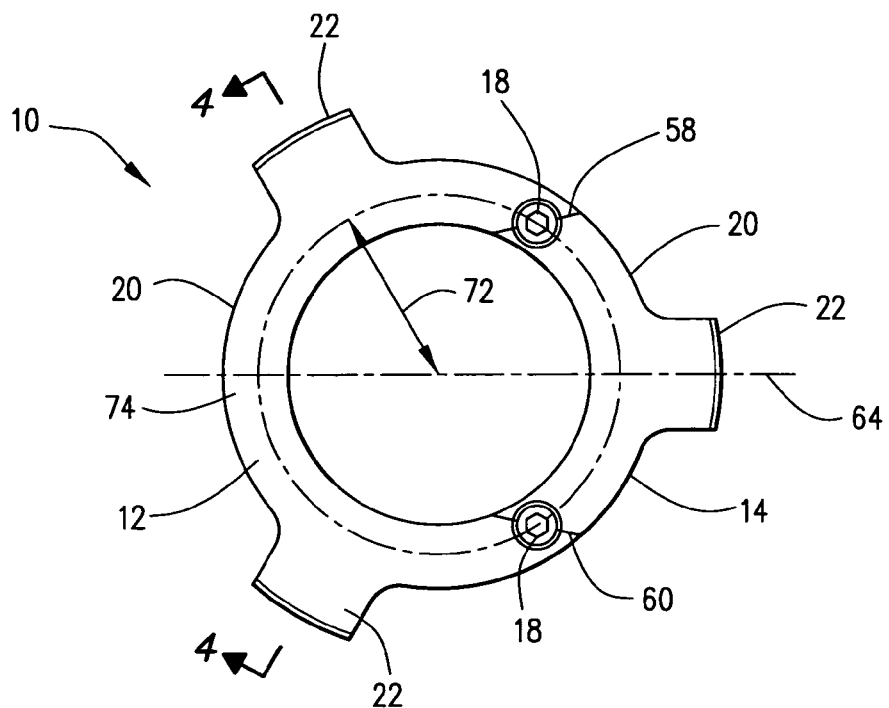
FIG. 3 is a top plan view of the wing nut.
Figure 4:
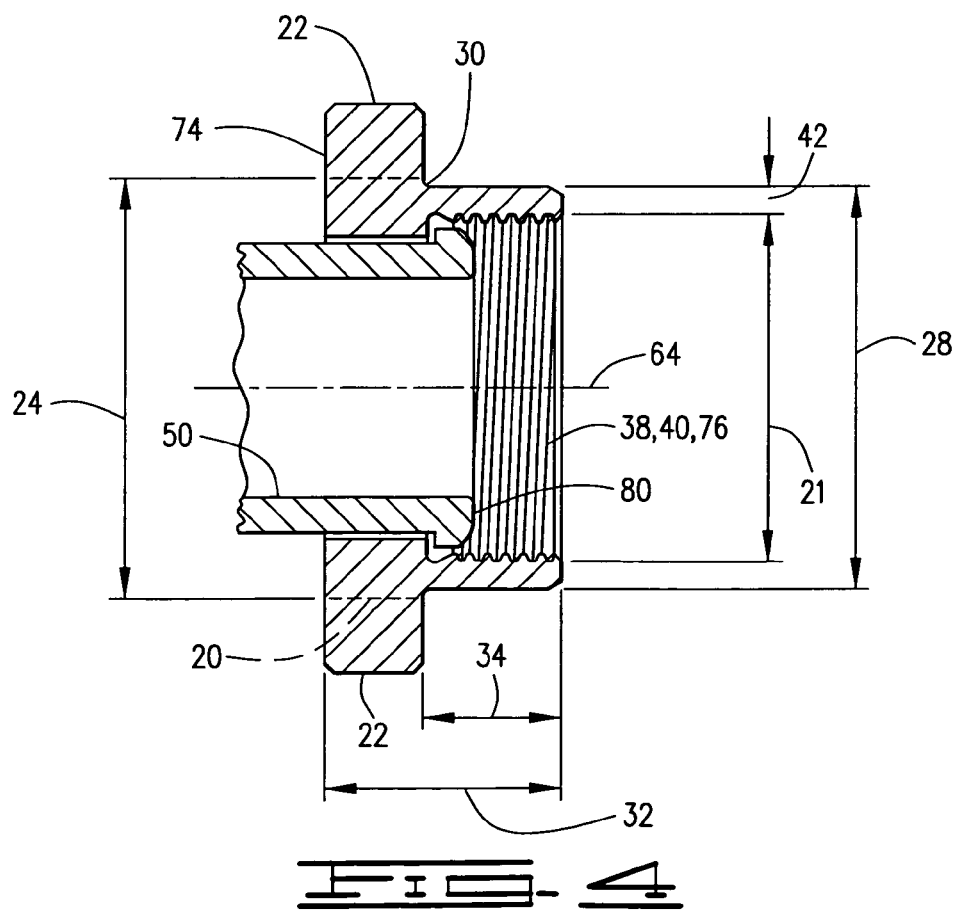
FIG. 4 is a cross-sectional view taken from FIG. 3 along line 4-4.
Figure 6:
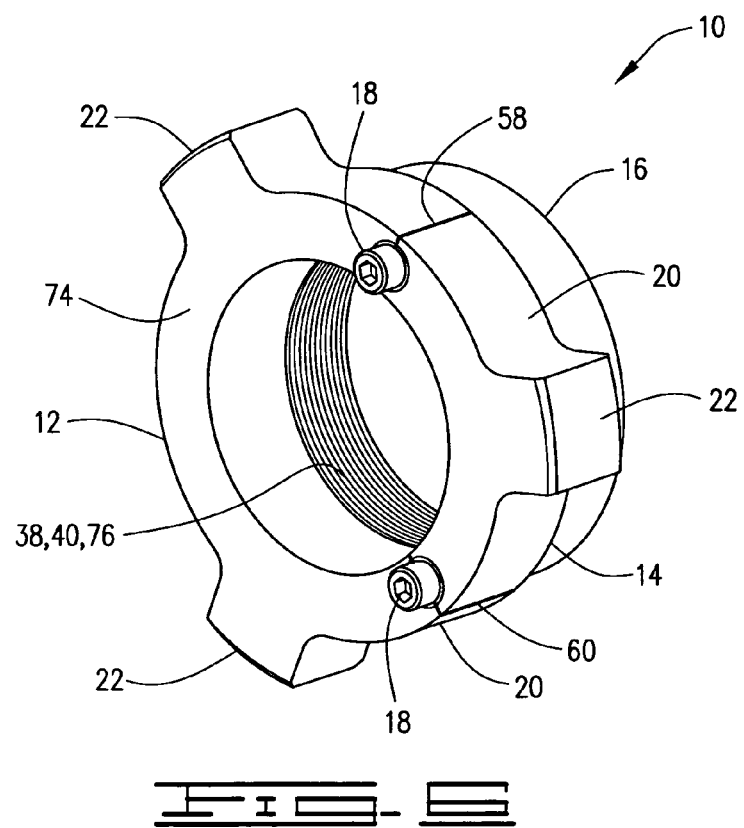
FIG. 6 is a top perspective view depicting the assembled wing nut.

Joints 58 and 60 are designed to ensure a tight seal between arcuate body 12 and arcuate insert 14. Thus, it is preferred that joints 58 and 60 have a radially straight seam as depicted in FIGS. 2, 3 and 6. Joint 58 preferably has an exemplary angle 62 of about 13 degrees. However, it is understood that angle 62 may be any angle that allows arcuate body 12 and arcuate insert 14 to be joined. Similarly, joint 60 preferably has an exemplary angle 66 of about negative 13 degrees. It is also understood that angle 66 may be any angle that allows arcuate body 12 and arcuate insert 14 to be joined. In FIG. 2, angles 62 and 66 are measured relative to horizontal centerline 64.

Figure 5:
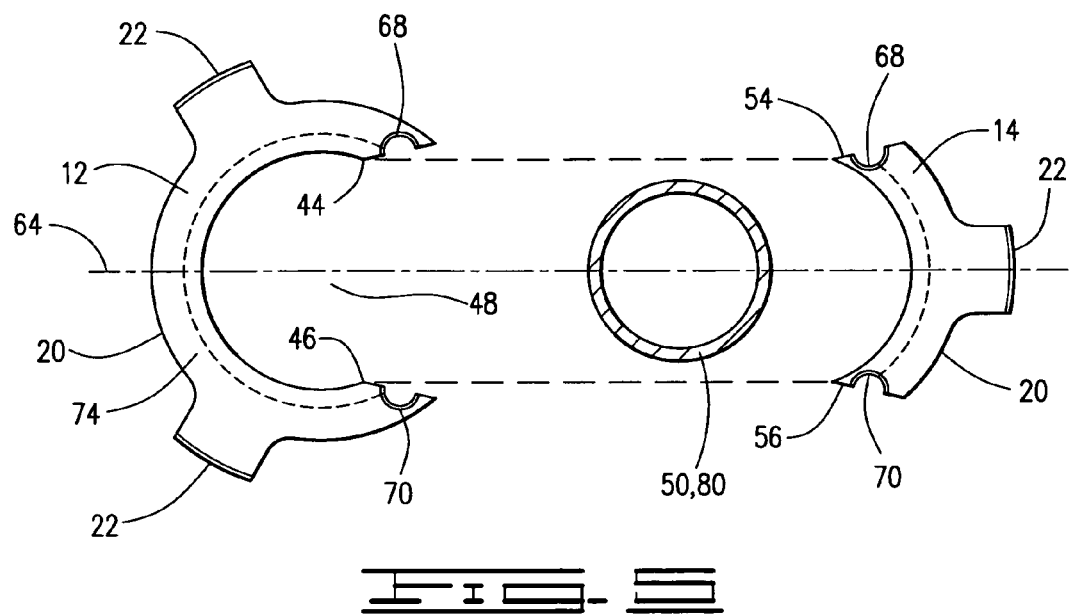
FIG. 5 is an exploded plan view of the wing nut with a pipe section.

Referring to FIG. 5, attachment openings 68 and 70 are preferably threaded, countersunk attachment openings centered on joints 58 and 60, and, referring to FIG. 3, having a radial center point 72 positioned on upper surface 74 of assembled wing nut 10. Preferably, radial center point 72 is positioned between first outer diameter 24 and inner diameter 21. Attachment devices 18 are threaded connectors that will hold arcuate body 12 and arcuate insert 14 in place so that connecting threads 40 may receive male thread segment 36, such as that on pipe segment 52, to connect pipe segments 50 and 52.

Figure 7:
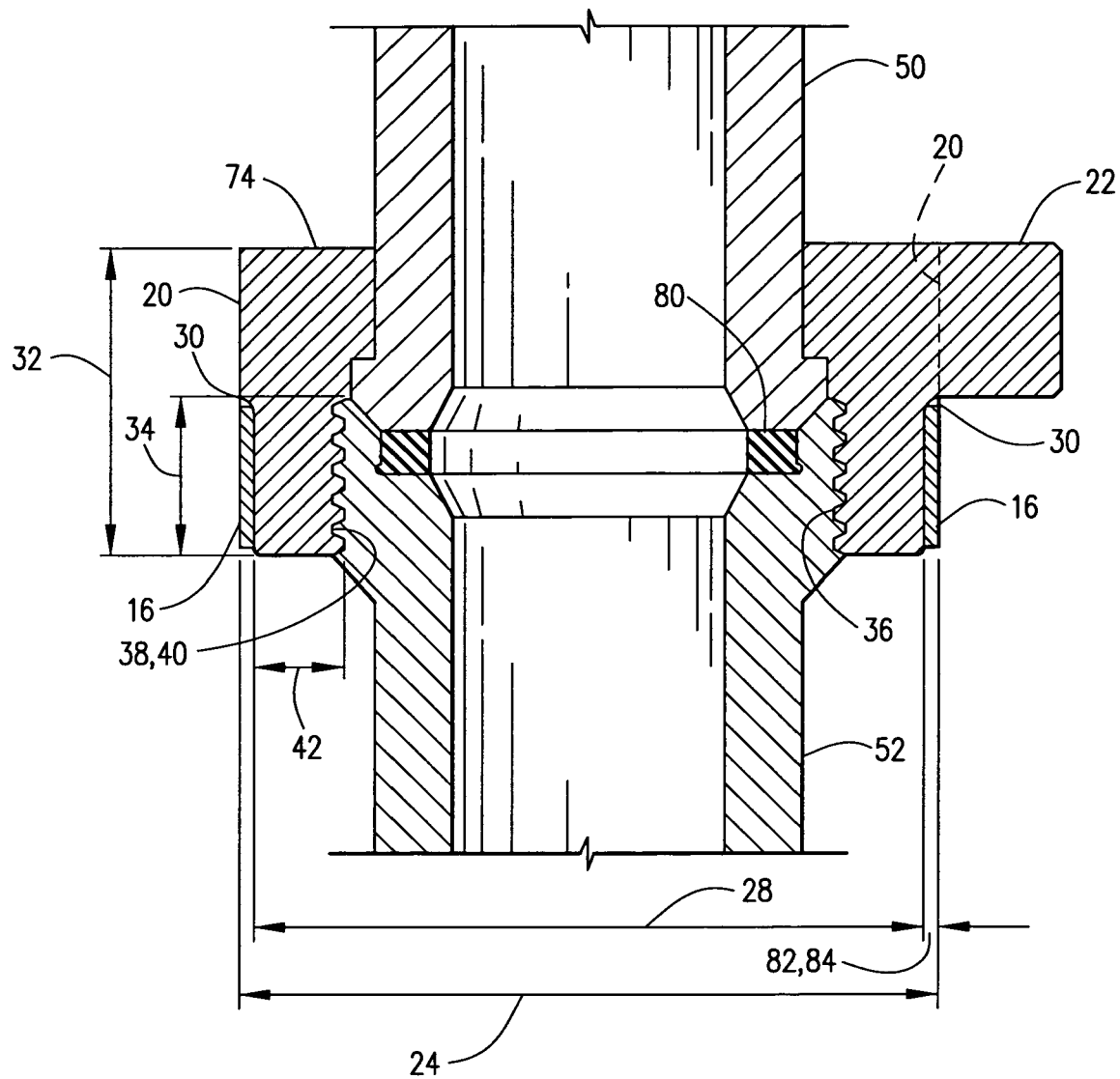
FIG. 7 is a cross-sectional view of the wing nut installed on a male threaded pipe segment.

Arcuate body 12 and arcuate insert 14 each define a portion of connecting threads 40 as depicted in FIGS. 1, 6 and 7. Arcuate body 12 has first thread portion 76 of mounting thread 40 thereon, while arcuate insert 14 has second thread portion 78 of mounting thread 40 thereon. When arcuate body 12 and arcuate insert 14 are connected and aligned, first and second threaded portions 76 and 78 form connecting or mounting thread 40. The alignment of first and second mounting thread 76 and 78 to form connecting thread 40 is facilitated by the insertion of attachment devices 18 into attachment openings 68 and 70. In the preferred embodiment, connecting threads 40 are preferably machined into arcuate body 12 and arcuate insert 14 while they are joined. As will be understood, arcuate body 12 and arcuate insert 14 may be threaded prior to being machined from a single piece into the separate arcuate body 12 and arcuate insert 14. Connecting threads 40 may also be part of a cast or forged wing nut 10. As described above, connecting threads 40 are located on threaded inner surface 38 of collar 26.

In the embodiment shown in FIGS. 1-7, three lugs 22 are employed. A minimum of one (1) lug 22 is required. The maximum number of lugs 22 is limited by the available circumferential space on annular body 20. However, it is anticipated that the number of lugs 22 will typically be between two (2) and four (4). Lugs 22 extend radially outward from annular body 20. The spacing between lugs 22 is not critical in that lugs 22 may be uniformly spaced or not uniformly spaced.

FIG. 5 depicts a plan view of wing nut 10 with three (3) lugs 22 and wing nut pipe segment 50. FIG. 5 depicts wing nut pipe segment 50 positioned to be received by arcuate body 12 through gap 48. In the preferred embodiment, wing nut pipe segment 50 is able to pass through gap 48 without external force applied. In other words, gap 48 has sufficient clearance for pipe segment 50 to pass therethrough.

Retaining ring 16, depicted in FIGS. 1 and 7, is designed to secure arcuate body 12 and arcuate insert 14 in the assembled state. Retaining ring 16 is preferably of a material having properties sufficient to resist the circumferential stress exerted upon it by arcuate body 12 and arcuate insert 14, once installed. It is preferred that retaining ring 16 have a coefficient of thermal expansion sufficient to allow it to expand to an inner diameter that is greater than second outer diameter 28 of collar 26 when heated. The same coefficient of thermal expansion of retaining ring 16 allows it, when cooled to an ambient temperature, to return to an inner diameter less than second outer diameter 28 of collar 26. Thus, when retaining ring 16 is heated and placed over collar 26 and then cooled, it will apply inwardly directed radial force to collar 26, and hold arcuate body 12 and arcuate insert 14 in place. Retaining ring 16, when installed, will preferably have a thickness 82 about equal to the width 84 of shoulder 30, and as such will have an outer diameter about the same as first outer diameter 24 of upper ring 20. Retaining ring 16 preferably has a length similar to collar length 34 of collar 26.

A method of installing wing nut 10 may require initially removing a deformed or damaged wing nut from a wing nut pipe segment 50. The damaged wing nut may be removed at any time prior to installing retaining ring 16. To install wing nut 10, arcuate body 12 radially receives pipe segment 50 through gap 48. Once pipe segment 50 is in place, arcuate insert 14 is inserted into gap 48 so that first and second clearance ends 44 and 46 of arcuate body 12 engage first and second mating ends 54 and 56 of arcuate insert 14. Attachment devices 18 are threaded into attachment openings 68 and 70, and are also used to align first and second mounting threads 76 and 78. Once first and second thread portions 76 and 78 are aligned to form connecting thread 40, the combined unit of arcuate body 12 and arcuate insert 14 is longitudinally moved along pipe segment 50 until it is positioned at pipe segment end 80, thereby making collar 26 accessible.

Retaining ring 16 is heated to a temperature that allows it to expand to an inner diameter greater than second outer diameter 28 of collar 26. The heated and expanded retaining ring 16 is slipped over collar 26, and allowed to cool to an ambient temperature. In one non-limiting example, retaining ring 16 is heated to about 400° F. It is preferred that retaining ring 16 be uniformly heated in a field oven or similar device. However, it is also acceptable to heat retaining ring 16 in any manner that creates near uniform thermal expansion without changing the material properties. After retaining ring 16 has radially retracted, pipe segment 52 may be threaded into collar 26 of wing nut 10. Wing nut 10 is thus a field replaceable wing nut that requires no welding, or machining, and requires no special training of field personnel.

Thus, it is shown that the apparatus and methods of the present invention readily achieve the ends and advantages mentioned, as well as those inherent therein. While certain preferred embodiments of the invention have been illustrated and described for purposes of the present disclosure, numerous changes in the arrangement and construction of parts and steps may be made by those skilled in the art. All such changes are encompassed within the scope and spirit of the present invention as defined by the appended claims.

What is claimed is:

1. A field replaceable wing nut comprising:
   an arcuate body defining a first portion of a mounting thread, the arcuate body defining a radial arc greater than 180 degrees;
   an arcuate insert defining a second portion of a mounting thread, the arcuate insert defining a radial arc complementary to the arc of the arcuate body that when connected to the arcuate body defines a complete circle; and
   an attachment device for connecting the arcuate body to the arcuate insert, wherein when the arcuate body and arcuate insert are connected, the first and second portions of the mounting thread define a complete mounting thread for receiving a threaded male pipe end.

2. The field replaceable wing nut of claim 1, wherein the arcuate body comprises a first and a second clearance end, the first and second clearance ends defining a gap therebetween.

3. The field replaceable wing nut of claim 2, wherein the gap is sized to radially receive a pipe therethrough.

4. The field replaceable wing nut of claim 1, wherein the attachment device has a threaded portion, wherein the threaded portion is adapted to align the first and second mounting thread portions.

5. The field replaceable wing nut of claim 1, wherein the connected arcuate body and arcuate insert define an outer ring and a collar extending from the outer ring, the collar having an outer diameter less than an outer diameter of the outer ring.

6. The field replaceable wing nut of claim 5, further comprising a retaining ring for securing the connected arcuate body and arcuate insert, wherein at an ambient temperature the retaining ring will apply a radially inwardly directed force to the collar.

7. The field replaceable wing nut of claim 6, wherein the retaining ring is comprised of a material having a coefficient of thermal expansion sufficient to allow it to expand to an inner diameter greater than the outer diameter of the collar when heated.

8. The field replaceable wing nut of claim 5, further comprising at least one lug positioned on the outer ring.

9. A wing nut comprising:
   a first arcuate body having a first portion of a mounting thread thereon, the first arcuate body defining a radial arc greater than 180 degrees, the first arcuate body having first and second clearance ends defining a circumferential gap therebetween, the first and second clearance ends having an acute angle;
   a second arcuate body having a second portion of a mounting thread thereon, the second arcuate body defining a radial arc complementary to the arc of the first arcuate body that when connected to the first arcuate body defines a complete circle, the second arcuate body having first and second mating ends for engaging the first and second clearance ends, the first and second mating ends having an obtuse angle; and
   a retaining ring disposed about the first and second arcuate bodies, the first and second threaded portions defining a complete connecting thread for receiving a threaded male pipe when the first and second arcuate bodies are connected.

10. The wing nut of claim 9, further comprising an attachment device for connecting the first arcuate body to the second arcuate body.

11. The wing nut of claim 10, further comprising:
    first and second seams defined by the engagement of the first and second mating ends with the first and second clearance ends;
    a first attachment device at the first seam; and
    a second attachment device at the second seam.

12. The wing nut of claim 9, wherein the gap is large enough for the first arcuate body to receive a pipe therethrough.

13. The wing nut of claim 9, the connected first and second arcuate bodies comprising an upper ring and a collar extending from the upper ring, wherein the retaining ring is adapted to circumscribe the collar.

14. The wing nut of claim 13, wherein at an ambient temperature the retaining ring will apply a radially inwardly directed force to the collar and wherein the retaining ring is comprised of a material having a coefficient of thermal expansion sufficient to allow it to expand to an inner diameter greater than the outer diameter of the collar when heated.

15. The wing nut of claim 9, further comprising at least one lug positioned on an upper ring.

16. A field replaceable wing nut comprising:
    an arcuate body defining a first portion of a mounting thread;
    an arcuate insert defining a second portion of a mounting thread;
    an attachment device for connecting the arcuate body to the arcuate insert, wherein when the arcuate body and arcuate insert are connected, the first and second portions of the mounting thread define a complete mounting thread for receiving a threaded male pipe end, wherein the connected arcuate body and arcuate insert define an outer ring and a collar extending from the outer ring, the collar having an outer diameter less than an outer diameter of the outer ring; and a retaining ring for securing the connected arcuate body and arcuate insert, wherein at an ambient temperature the retaining ring will apply a radially inwardly directed force to the collar, wherein the retaining ring is comprised of a material having a coefficient of thermal expansion sufficient to allow it to expand to an inner diameter greater than the outer diameter of the collar when heated.

17. A wing nut comprising:

a first arcuate body having a first portion of a mounting thread thereon, the first arcuate body having first and second clearance ends defining a circumferential gap therebetween;

a second arcuate body having a second portion of a mounting thread thereon, the second arcuate body having first and second mating ends for engaging the first and second clearance ends;

a retaining ring disposed about the first and second arcuate bodies, the first and second threaded portions defining a complete connecting thread for receiving a threaded male pipe when the first and second arcuate bodies are connected; and an upper ring and a collar defined on the connected first and second arcuate bodies, the retaining ring adapted to circumscribe the collar, wherein at an ambient temperature the retaining ring will apply a radially inwardly directed force to the collar, and wherein the retaining ring is comprised of a material having a coefficient of thermal expansion sufficient to allow it to expand to an inner diameter greater than the outer diameter of the collar when heated.

* * * * *